United States Patent [19]

Tsunekawa

[11] Patent Number: 4,484,223
[45] Date of Patent: Nov. 20, 1984

[54] IMAGE SENSOR

[75] Inventor: Tokuichi Tsunekawa, Yokohama, Japan

[73] Assignee: Canon Kabushiki Kaisha, Tokyo, Japan

[21] Appl. No.: 269,804

[22] Filed: Jun. 3, 1981

[30] Foreign Application Priority Data

Jun. 12, 1980 [JP] Japan .................................. 55-79257
Mar. 31, 1981 [JP] Japan .................................. 56-47612

[51] Int. Cl.³ .............................................. H04N 3/15
[52] U.S. Cl. .................................... 358/213; 358/221
[58] Field of Search ................. 358/213, 212, 221, 44, 358/41; 354/410, 419, 420; 250/201, 204

[56] References Cited

U.S. PATENT DOCUMENTS

| | | | |
|---|---|---|---|
| 4,004,852 | 1/1977 | Pentecost | 356/1 |
| 4,178,098 | 12/1979 | Asano et al. | 356/1 |
| 4,189,232 | 2/1980 | Asano et al. | 356/1 |
| 4,293,877 | 10/1981 | Tsunekawa | 358/221 |
| 4,305,657 | 12/1981 | Masunaga et al. | 356/1 |
| 4,329,033 | 5/1982 | Masunaga et al. | 354/25 |
| 4,335,405 | 6/1982 | Sakane | 358/213 |
| 4,368,978 | 1/1983 | Tsunekawa et al. | 356/1 |

FOREIGN PATENT DOCUMENTS 113426 3/1978 Japan .................................. 358/221

Primary Examiner—Tommy P. Chin
Attorney, Agent, or Firm—Fitzpatrick, Cella, Harper & Scinto

[57] ABSTRACT

An image sensor causes a solid-state imaging device, at the scanning of an image, to release in succession a dark current signal generated in the solid-state imaging device and a scanning signal containing said dark current signal, subtracts said dark current signal from said scanning signal by a differential circuit to obtain an image signal corresponding to said image, and so regulates by means of an integrating time control circuit and in response to the level of said image signal, the image signal integrating time of said solid-state imaging device as that said image signal remains within a certain level range. In an improvement of the present invention there is further provided means for forcedly resetting the image signal integrating time to be determined by said integrating time control circuit to a shorter time in case the image signal reaches an inappropriate level while said image signal integrating time is fixed at a determined level without renewed control thereof.

24 Claims, 22 Drawing Figures

| FIG. 3A | FIG. 3B |

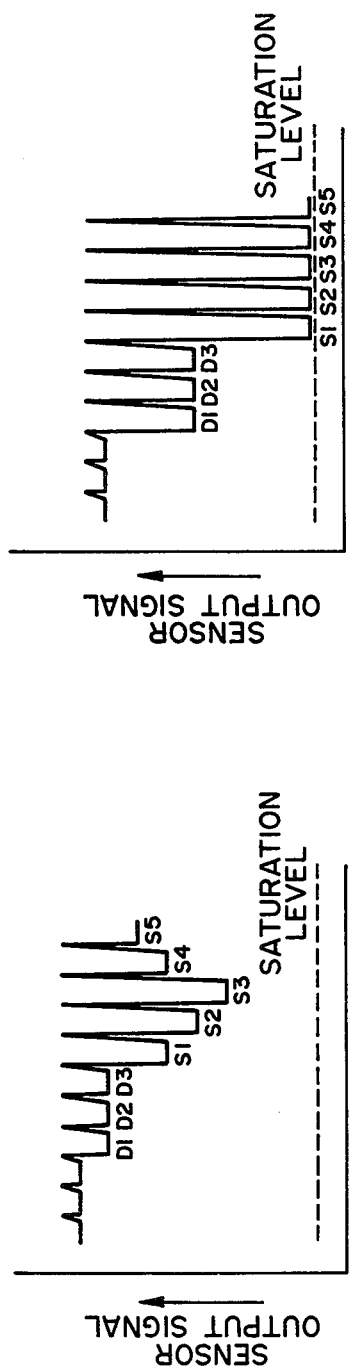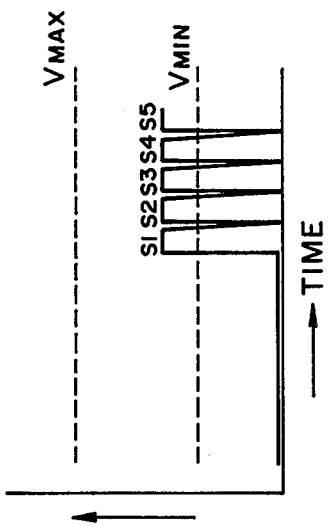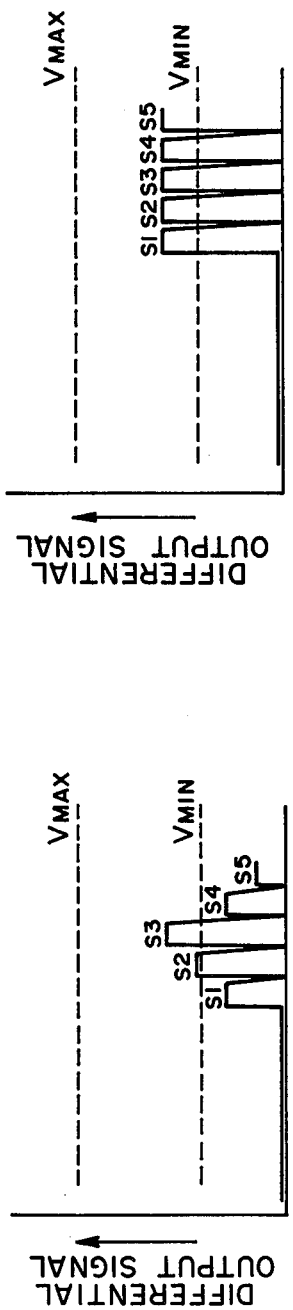

IMAGE SENSOR

BACKGROUND OF THE INVENTION

1. Field of the Invention

The present invention relates to an image sensor, and more particularly to an image sensor adapted for causing a solid-state imaging device, in the scanning of an image, to release in succession a dark current signal generated in the solid-state imaging device and a scanning signal containing said dark current signal, subtracting said dark current signal from said scanning signal by a differential circuit to obtain an image signal corresponding to said image, and so regulating, by means of an integrating time control circuit and in response to the level of said image signal, the image signal integrating time of said solid-state imaging device that said image signal remains within a determined level range.

2. Description of the Prior Art

Solid-state imaging devices such as charge-coupled devices, recently employed in various applications, are associated, in the output signal thereof, with a noise component resulting from dark current in such devices, and are often unable to exhibit proper performance because of such noise. In an image sensor utilizing such a solid-state imaging device it is therefore necessary to detect such noise component resulting from dark current and to eliminate such noise component from the output signal, and various methods have been proposed for this purpose. For example there is already proposed a technology for so-called dark current compensation in which a part of the photoreceptor area of the solid-state imaging device is masked to obtain the dark current component in said masked area of the solid-state imaging device, and the thus obtained dark current component is retained and subtracted from the scanning signal obtained in the unmasked area of said device.

On the other hand, the solid-state imaging device requires control of the charging accumulating time or optical signal integrating time in order to expand the dynamic range in response to the luminance of the incident light, and there are already known certain technologies for this purpose. As an example there is proposed a method of comparing a certain level, for example the peak level, of the scanning signal obtained from the solid-state imaging device with a determined voltage level and reducing or extending the integrating time respectively when said signal peak level is higher or lower than said voltage level, thereby maintaining the peak level of the scanning signal within said voltage level range.

However, the aforementioned dark current compensation for the scanning output signal from the solid-state imaging device and the control for the signal integrating time in response to the level of the scanning signal, if employed in combination, may lead to an inconvenience as explained in the following. For example, in case of a sudden and rapid increase in the intensity of incident light to the photoreceptor area during the integration of optical signal by a solid-state imaging device with a relatively long integrating time controlled by the integrating time control circuit, the aforementioned masked area receives increased light leakage to accumulate a significantly increased charge therein, thus greatly raising the level of dark current signal retained in the dark current latch circuit at the signal readout from said solid-state imaging device, whereby the level of the scanning signal after the elimination of the dark current component by a dark current compensating circuit, usually composed of a differential circuit, remains almost the same as before or becomes very low. As the result the peak level of the scanning signal detected by the peak detecting circuit also remains almost unchanged or becomes very low, so that the signal integrating time of the solid-state imaging device, which should be shortened in response to the increased light intensity, remains fixed to the above-mentioned long integrating time or even changed to a longer integrating time. Such inconvenience is naturally not limited to the case of providing masked areas for dark current component detection in a part of the photoreceptor of the device, but is observable also in a case of detecting the dark current component from the charge generated in the analog shift register for charge transfer in the charge coupled device, since a rapid increase in the intensity of incident light to photoreceptor may cause the so-called blooming phenomenon, leading to the charge diffusion into said analog shift register, or may directly generate charge therein by photoexcitation, thus increasing the dark current component. Also such inconvenience is not limited to the case of identifying the integrating time in response to the peak level of the scanning signal as explained in the foregoing, but occurs also in a method relying on the average value of the scanning signal or in a method relying on the counting of "1" or "0" of the binarized scanning signal as disclosed in the U.S. Pat. No. 4,004,852. In this manner said inconvenience is inevitably inherent to the use in combination of the dark current compensation for the scanning output signal from the solid-state imaging device and the control of signal integrating time in response to the scanning signal obtained from said device.

SUMMARY OF THE INVENTION

The object of the present invention, achieved in consideration of the aforementioned situation, is to provide an improvement in the image sensor which provides quantized image data utilizing the dark current compensation for the scanning output signal from the solid-state imaging device and the control of the signal integrating time in response to the level of scanning signal in combination, or, more specifically, which is adapted for causing the solid-state imaging device, at the scanning of an image, to release in succession the dark current signal generated in said device and scanning signal containing said dark current signal, subtracting said dark current signal from said scanning signal by a differential circuit to obtain an image signal corresponding to said image, and so regulating, by means of an integrating time control circuit and in response to the level of said image signal, the image signal integrating time of said solid-state imaging device, so that said image signal remains within a determined level range, wherein said improvement allows one to securely prevent the inconvenience of fixation of signal integrating time in response to a sudden increase in the intensity of incident light under a relatively long signal integrating time as mentioned in the foregoing, thus maintaining satisfactory control over the signal integrating time also in such a situation.

For achieving the above-mentioned object, the present invention proposes a more advantageous arrangement of the above-mentioned image sensor wherein provided is means for forcedly resetting the image signal integrating time determined by said integrating time control circuit to a shorter time in case the image signal reaches an inappropriate level while said image signal integrating time remains unchanged or fixed at a determined level without renewed control thereof.

As a particularly advantageous arrangement, there is proposed an embodiment having a resetting circuit for resetting the signal integrating time of the solid-state imaging device determined by said integrating time control circuit to a shorter integrating time from a previously set time in case the image signal from said differential circuit is identified as lower than the lower limit of the predetermined level range when the solid-state imaging device is regulated to the maximum signal integrating time controllable by said integrating time control circuit.

Also in another embodiment there is provided means for resetting the signal integrating time of the solid-state imaging device determined by said integrating time control circuit to a shorter integrating time in case the quantized image data obtained from the quantizing circuit are identified to be composed of data consisting of a uniform digital value (e.g., all binary 1's or all 0's, in the case of binary data.

In still another embodiment said resetting circuit resets the signal integrating time of the solid-state imaging device to a shorter integrating time in case the image signal is identified to be in an inappropriate level continuously for a determined period while the signal integrating time of said solid-state imaging device is maintained fixed. This embodiment has been achieved in consideration of the fact that such rapid increase in the intensity of incident light may often be instantaneous and be cancelled before the succeeding scanning so that the integrating time should not be changed in such case, and it is therefore particularly effective for such instantaneous change in the incident light as explained in the foregoing.

In an improvement of said embodiment the signal integrating time of the solid-state imaging device is reset to a shorter integrating time in case the inappropriate level of the image signal continues for a period determined in relation to the integrating time determined by the integrating time control circuit, and also disclosed is an arrangement in which said resetting circuit is provided with a time constant circuit which is reset to an original state each time the integrating time is changed by the integrating time control circuit, thereby ensuring effective resetting in response to the integrating time determined by said integrating time control circuit.

Furthermore, as an improvement to the first mentioned embodiment there is disclosed an arrangement in which said resetting circuit is adapted to reset the signal integrating time of the solid-state imaging device determined by said integrating time control circuit to a shorter integrating time in case the image signal from said differential circuit is identified as lower than the lower limit of said determined level range when the solid-state imaging device is regulated to the longest signal integrating time controllable by said integrating time control circuit and in case the image luminance in this state is in excess of a determined level. As explained in the foregoing, the excessively low level of scanning signal even at the longest signal integrating time may occur in two cases, i.e. when the intensity of the incident light is excessively low for the image sensor, or when said intensity is very high to result in an elevated level of the dark current component, and the above-mentioned improvement is effective in identifying these two cases and resetting the integrating time only in the latter case for obtaining an appropriate scanning signal.

The above-mentioned shorter integrating time to be selected by said resetting circuit means the shortest controllable integrating time or a relatively short time close thereto, and is most effectively selected as the shortest integrating time. However such selection is naturally not decisive but may be suitably changed according to the purpose of the image sensor.

Still other objects and advantages of the present invention will be made apparent from the following description to be taken in conjunction with the attached drawings.

BRIEF DESCRIPTION OF THE DRAWINGS

FIGS. 8A–8D are charts showing the relation of the change in dark current level and the change in output signal after dark current compensation on which another embodiment of the present invention is based;

DETAILED DESCRIPTION OF THE PREFERRED EMBODIMENTS

Figure 1:
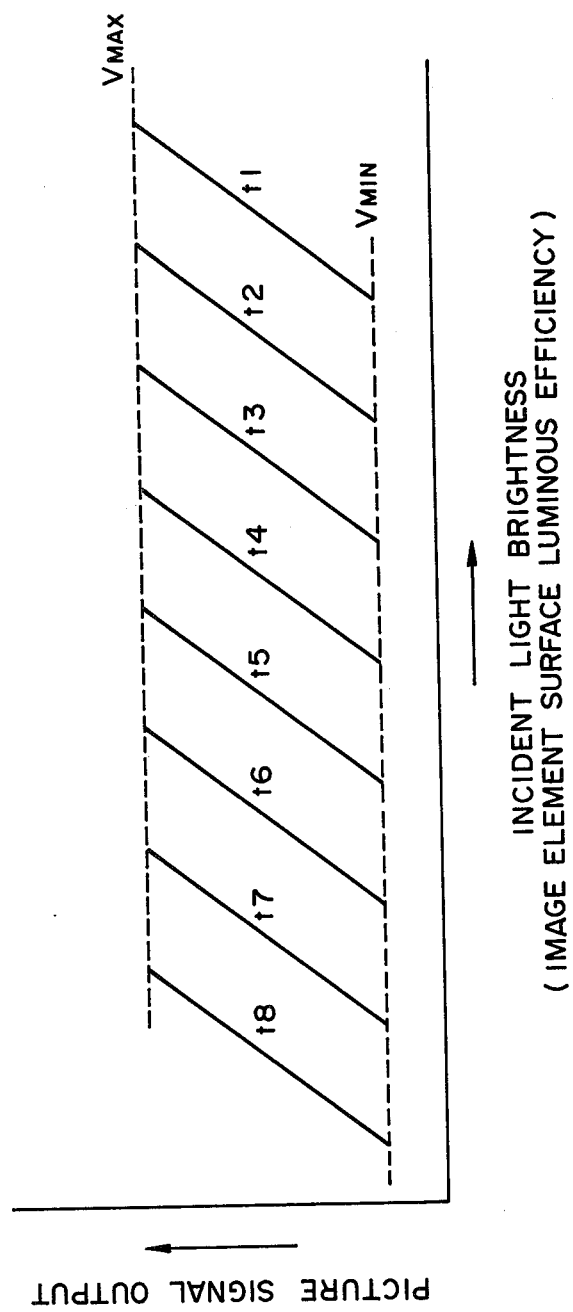
FIG. 1 is a chart showing the relation of the incident light intensity to a solid-state imaging device or element, signal integrating time thereof and output picture signal.

FIG. 1 shows the relationship among the incident light brightness to a solid-state imaging device or element, the corresponding signal integrating time or accumulating time variable in eight steps from a shortest time $t_1$ to a longest time $t_8$, and the output picture signal. $V_{max}$ and $V_{min}$ respectively stand for an upper limit and a lower limit of a determined signal range determined for example for the peak value of the output picture signal, and, in case the peak value of the output picture signal tresspasses said upper or lower limit, the accumulating time is so controlled as to return said peak value within the above-mentioned range.

FIGS. 2A-2D, schematically show the relation between the change in dark current level resulting from excessive charge flow caused by blooming phenomenon or from light leak and the change in output signal after dark current compensation, on which an embodiment of the present invention is based.

Figure 2:
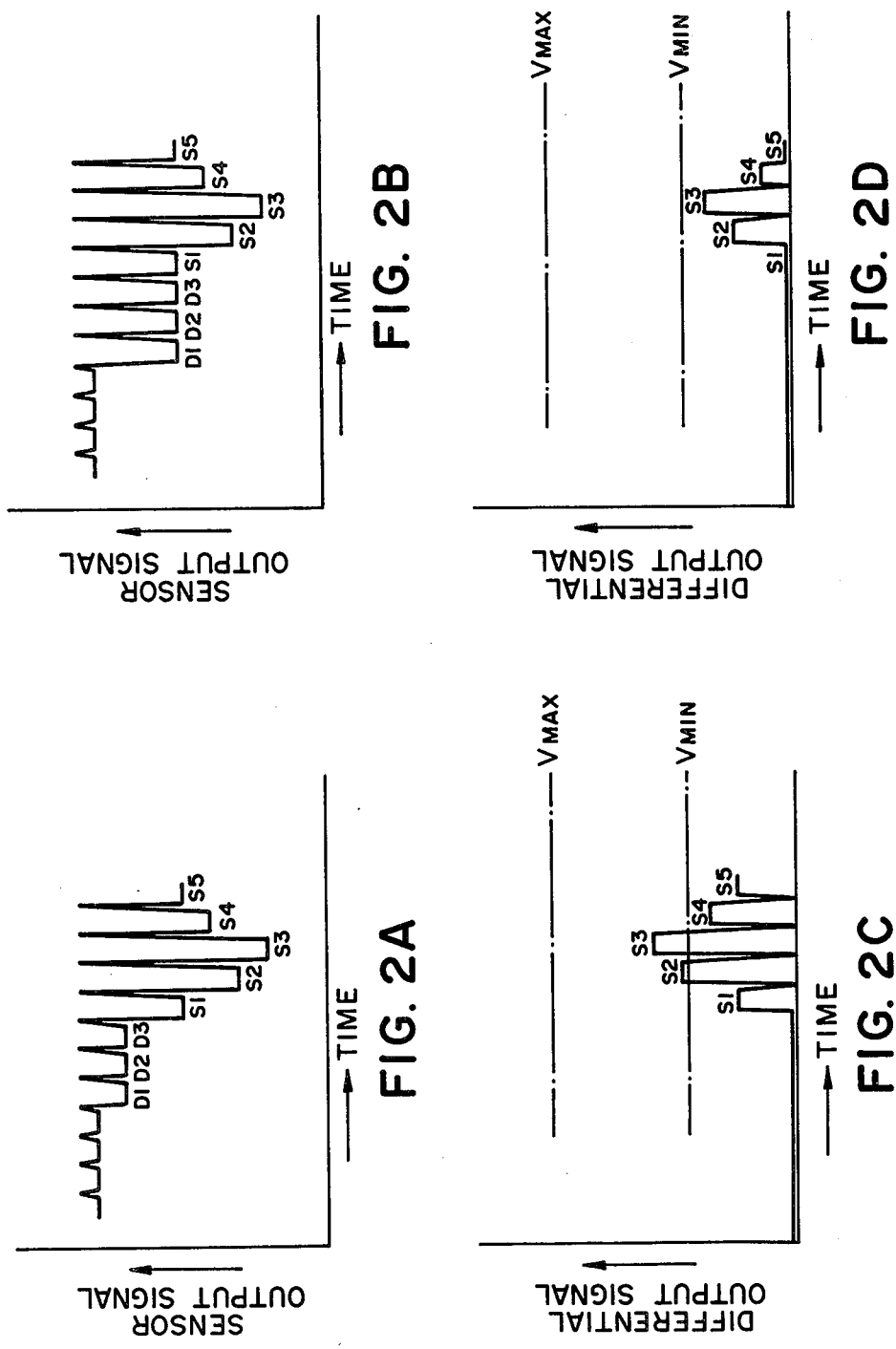
FIGS. 2A–2D are charts showing the relation of the change in dark current signal and the change in output signal after dark current compensation on which an embodiment of the present invention is based.

FIGS. 2A and 2B are waveform charts showing time-sequential output of picture information from the solid-state imaging device in which D1-D3 are output signals from dummy pixels for dark current detection while S1-S5 are output signal from photoreceptor pixels. FIGS. 2A and 2B respectively show the absence and presence of the blooming phenomenon or light leak in the dummy pixels D1-D3. FIGS. 2C and 2D are waveform charts showing the differential output signals obtained by subtracting the dark current component obtained in the dummy pixels D1-D3 from the picture information containing the dark current component obtained from the photoreceptor pixels S1-S5, wherein FIG. 2C represents appropriate output waveform while FIG. 2D represents inappropriate output waveform caused by the increase in the dark current signal. In the state of FIG. 2D the peak value of the differential output signal becomes lower than the aforementioned lower limit Vmin of said range because of the increase in the dark current component, whereby the accumulating time control circuit identifies the low level of the picture signal and further extends the accumulating time. Consequently the light exposure or integration in the photoreceptor pixels is further increased to enhance the excessive charge flow by the blooming phenomenon or the light leak into the dummy pixels, in response to which the differential output signal is further reduced to again extend the accumulating time, whereby the accumulating time is eventually fixed to the longest time t8 shown in FIG. 1, and the differential output signal also is fixed to a peak level lower than the lower limit Vmin shown by the broken line in FIG. 1.

In general, in an image sensor utilizing a solid-state imaging device, the signal integrating time thereof is controlled within a range in anticipation of the highest and lowest light intensity encountered in the use of said image sensor. In such image sensor, an excessively low level of scanning signal in combination with the longest integrating time is not only observable when the incident light intensity is excessively low for the image sensor but is often encountered when the light intensity is very high, with an extremely increased dark current component. In the latter case, the image sensor can provide the proper picture signal again if the signal integrating time of the solid-state imaging device is changed to a shorter integrating time.

Now there will be explained an embodiment of the present invention achieved in consideration of the foregoing.

Figures 3, 4:
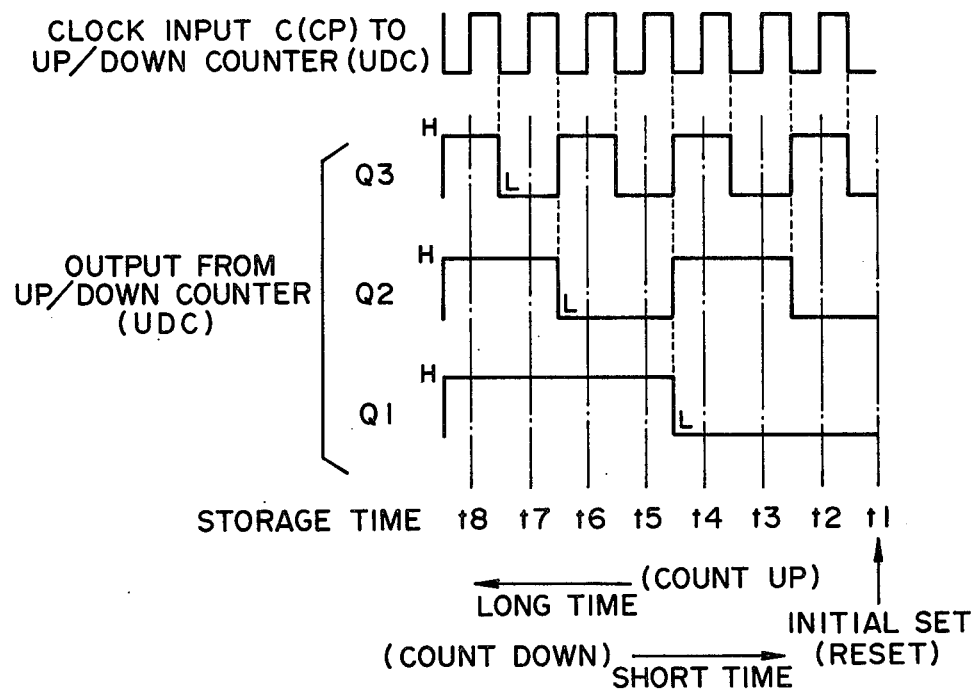
FIG. 3 is a block chart showing the relative positions of FIGS. 3A and 3B.
FIG. 4 is a chart showing the relation of the output signal from an up-down counter for determining the accumulating time (signal integrating time) and the accumulating time selected by said output signal in the embodiment shown in FIGS. 3A and 3B.
Figure 3A:
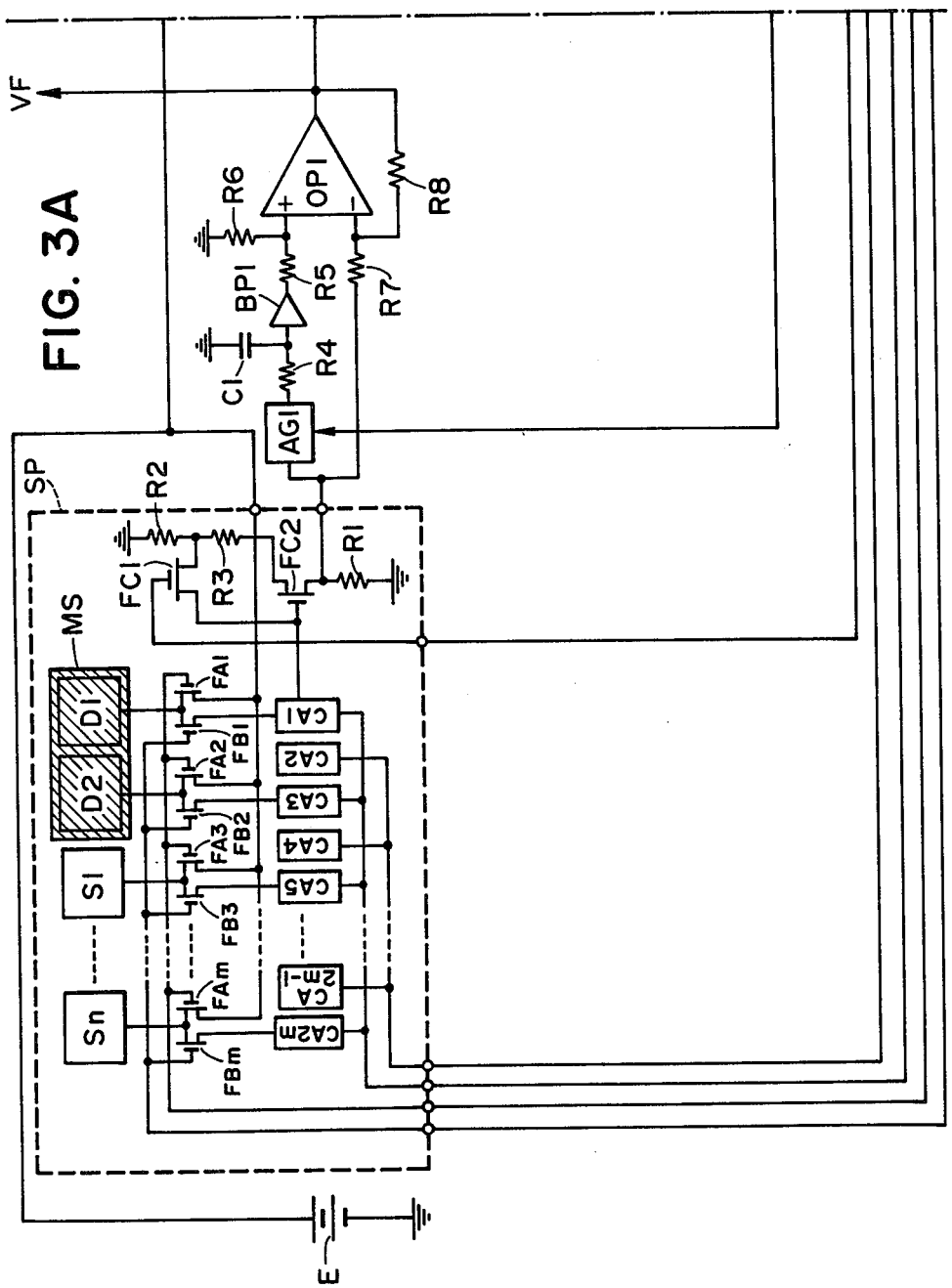
FIGS. 3A and 3B together are a circuit diagram showing an embodiment of the present invention.
Figure 3B:
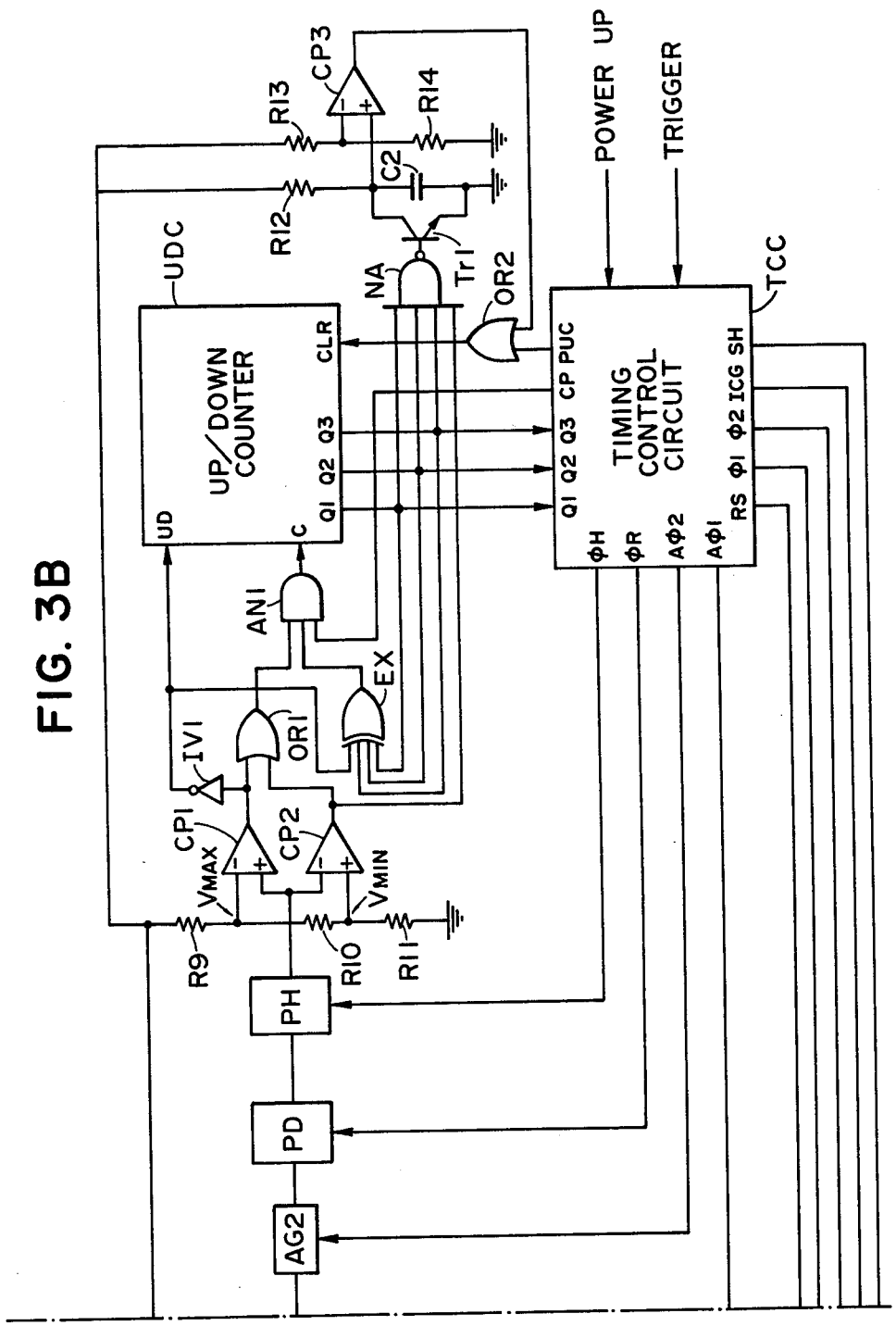

FIGS. 3A and 3B show an embodiment of the present invention, wherein shown are a solid-state imaging device SP such as a CCD or a photodiode array comprising photoreceptor of n pixels S1-Sn and dummy pixels D1, D2 shielded for example by a mask MS for dark current detection; integration clear gates FA1, FA2, . . . , FAm (m=n+2) for clearing the charges accumulated in said pixels S1-Sn, D1, D2 in response to an H-level integration clear signal ICG; and charge transfer gates FB1, FB2, . . . , FBm for transferring the charges accumulated in said photoreceptor pixels S1-Sn corresponding to the integrated light incident thereto or the charges accumulated in said dummy pixels D1, D2 corresponding to the dark current to a charge-transfer analog shift register CA1-CA2m, of which output charges are released as voltage information through a charge-voltage converting circuit composed of resistors R1, R2 and R3 and FET's FC1 and FC2.

An analog gate AG1 for obtaining the signals from the dummy pixels D1, D2 of the imaging device SP constitutes a dark current latch circuit in combination with a holding condenser C1, a resistor R4 and a buffer amplifier BP1. A resistor R4 constituting a low-pass filter with said condenser C1 may be dispensed with in certain cases. Resistors R5, R6, R7 and R8 and an operational amplifier OP1 constitute a differential amplifier for dark current compensation and subtracts the dark current component obtained from said dummy pixels D1, D2 and retained in said dark current latch circuit from the picture information obtained from said photoreceptor pixels S1-Sn and containing said dark current component, thereby providing the true picture information VF.

There are also shown an analog gate AG2 for obtaining the signals corresponding to the photoreceptor pixels S1-Sn from the output of said differential amplifier circuit; a peak detection circuit PD for detecting the peak value VP of the signal obtained through said analog gate AG2; a peak hold circuit PH for retaining the peak value VP detected by said peak detection circuit; voltage-dividing resistors R9, R10 and R11 for obtaining reference voltages Vmax and Vmin respectively corresponding to the aforementioned upper and lower limits; a comparator CP1 for comparing the peak value VP retained in the peak hold circuit PH with said upper limit reference voltage Vmax and releasing an H-level or L-level signal respectively when VP>Vmax or VP≦Vmax; a comparator CP2 for comparing said peak value VP with said lower limit reference voltage and an H-level or L-level signal respectively to indicate the deleted condition that VP<Vmin or VP≧Vmin; an inverter IV1 for inverting the output from said comparator CP1 and supplying a count mode control signal to an up-down counter UDC for determining the accumulating time, which is composed of a 3-bit up-down binary counter in the present embodiment and assumes the up-count mode or down-count mode in response to the H- or L-level of the output signal from said inverter IV1; an OR gate OR1 receiving the output signals from the comparators CP1 and CP2; an exclusive-OR gate EX receiving the 3-bit output Q1, Q2 and Q3 of said up-down counter UDC and the output from said inverter IV1; and an AND gate AN1 receiving the output signals from said OR gate OR1 and from said exclusive-OR gate EX and count pulses CP to be supplied from a timing control circuit TCC and supplying count clock pulses to said up-down counter UDC. Said exclusive-OR gate EX is provided, in case a shift instruction for a shorter or longer integrating time is released from the comparator CP1 or CP2 when the accumulating time is already adjusted to the shortest or longest accumulating time, for preventing the resetting of said up-down counter UDC and maintaining said shortest or longest accumulating time. FIG. 4 shows the relationship between the 3-bit output signals of said up-down counter UDC and the aforementioned accumulating time in 8 steps.

Figure 5:
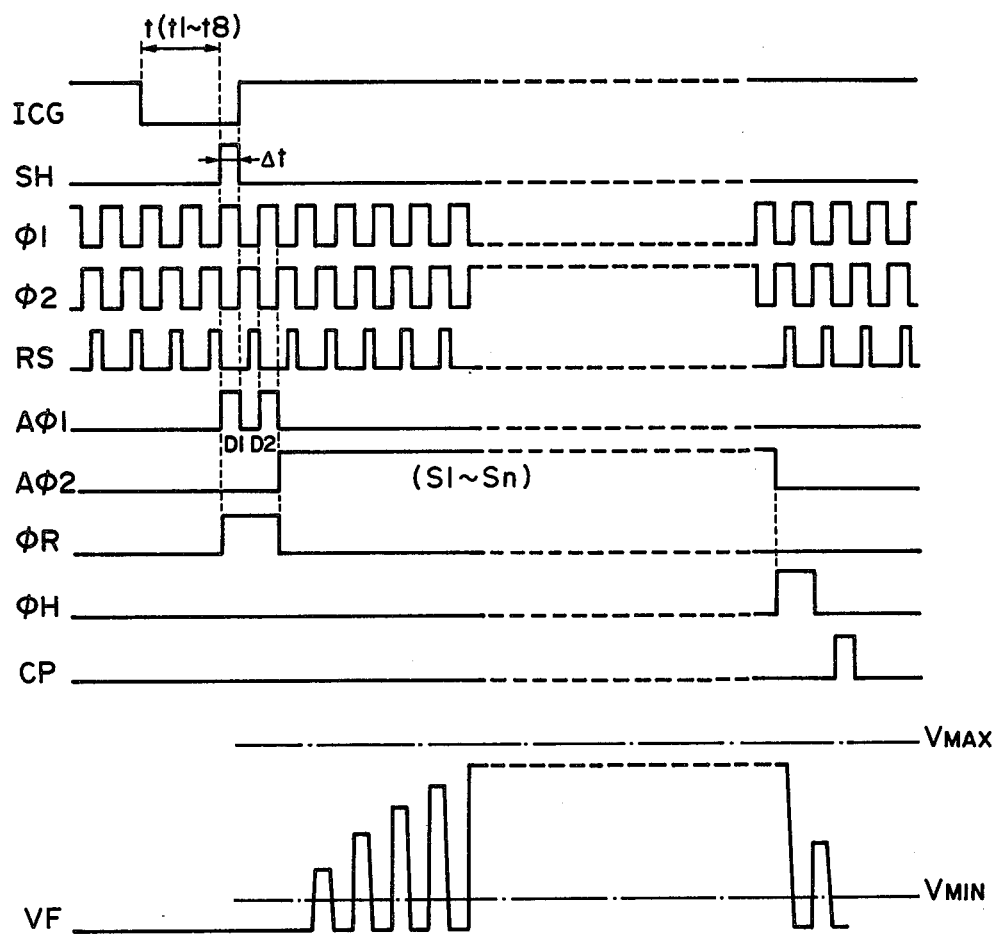
FIG. 5 is a timing chart showing the function of the embodiment shown in FIG. 3.

There are further shown a timing control circuit TCC for generating control pulses and control signals according to the timing chart shown in FIG. 5; a reset pulse PUC for said up-down counter UDC for setting the solid-state imaging device SP to the shortest accumulating time t1 at the start of power supply; a count pulse CP (or accumulating time control pulse) for said up-down counter UDC generated for each signal readout from the solid-state imaging device SP; a gate control signal $A\phi1$ for said analog gate AG1 for obtaining the signals corresponding to said dummy pixels D1, D2 for dark current detection through said gate for each signal readout; a gate control signal $A\phi2$ for said analog gate AG2 for obtaining the signals corresponding to said photoreceptor pixels S1–Sn from the output signals of said differential amplifier through said gate for each signal readout; a peak resetting control signal $\phi B$ for resetting said peak detection circuit PD at the start of each signal readout; a peak holding control signal $\phi H$ for causing the peak holding circuit PH to store, at the end of each signal readout, the peak value VP retained in said peak detection circuit PD before the resetting thereof; a gate control shift pulse SH for the charge transfer gate FB1–FBm in said solid-state imaging device SP; an integration clearing gate control pulse ICG for the gates FA1–FAm; transfer clock pulses $\phi1$, $\phi2$ for the charge transfer analog shift register CA1–CA2m which is operated in two-phase mode, wherein said shift pulse SH is synchronized with the pulse $\phi1$; and a reset pulse RS for the transistor FC1 in the charge-voltage converting circuit.

Said timing control circuit TCC controls the charge accumulating time of the solid-state imaging device SP in response to the time information indicated by the output signals Q1–Q3 of the up-down counter UDC, and, more specifically, achieves said control by changing the period t in 8 steps (t1–t8) from the trailing end of the integration clearing signal ICG to the leading end of the shift pulse SH in response to the state of said output signals Q1–Q3 of the up-down counter UDC. Consequently the actual charge accumulating time of the solid-state imaging device SP is represented by the above-mentioned period t plus the H-level duration $\Delta t$ of the shift pulse SH. The solid-state imaging device SP is of two-phase mode as explained above, in which the signal output from each pixel is synchronized with the pulse $\phi1$ and initiated in synchronization with the shift pulse SH.

The image sensor explained in the foregoing is further provided with an arrangement for resetting the accumulating time according to the improvement of the present invention. More specifically, in FIG. 3B, there are shown a NAND gate NA for forming the inverted logic product of the output signals Q1–Q3 of the up-down counter UDC; a resistor R12 and a condenser C2 constituting a time constant circuit; an npn switching transistor Tr1 for short-circuiting said condenser C2 to activate said time constant circuit in response to the L-level state of the output from said NAND gate NA; voltage-dividing resistors R13, R14 for obtaining a determined reference voltage; and a comparator CP3 for comparing the terminal voltage of said condenser C2 with the reference voltage obtained by said resistors R13, R14 and releasing an H-level signal when the former exceeds the latter, wherein said signal is supplied to an OR gate OR2 which also receives the clearing pulse PUC from said timing control circuit TCC and releases the reset pulse to said up-down counter UDC.

In the above-explained circuit, in response to the turning on of the power supply, the timing control circuit TCC supplies a reset pulse or power-up clear pulse PUC through the OR gate OR2 to the up-down counter UDC, whereby said up-down counter UDC is reset to release L-level signals to the outputs Q1–Q3, thus setting the solid-state imaging device SP to the shortest accumulating time t1. Also in response to the turning on of the power supply said timing control circuit TCC initiates the supply of clock pulses $\phi1$, $\phi2$ and reset pulses RS to the solid-state imaging device SP and shifts the integration clearing signal ICG to the H-level thereby opening the integration clearing gates FA1–FAm, thus forbidding the charge accumulation in the pixels D1, D2, S1–Sn. In response to an external trigger signal supplied in this state, the timing control circuit TCC immediately shifts the integration clearing signal ICG to the L-level as shown in FIG. 5 thereby closing said gates FA1–FAm to initiate the charge accumulation in said pixels D1, D2, S1–Sn and to initiate the counting of the accumulating time (shortest accumulating time t1 in this case) indicated by the output signals Q1–Q3 of the up-down counter UDC, and releases the shift pulse SH upon completion of said counting. Consequently the charge transfer gates FB1–FBm are opened to transmit the charges accumulated in said pixels D1, D2, S1–Sn during said time counting to the corresponding bits of the charge transfer analog shift register CA1–CA2m, and further to the charge-voltage converting circuit whereby said charges are released, after conversion, as voltage information. After releasing the shift pulse SH, the timing control circuit TCC again shifts the integration clearing signal ICG to the H-level to open the integration clearing gates FA1–FAm thereby forbidding the charge accumulation in the pixels D1, D2, S1–Sn. After the output of scanning signal from the solid-state imaging device SP is initiated in this manner, the timing control circuit TCC shifts the gate control signal $A\phi1$ to open the analog gate AG1 in synchronization with the output of signals corresponding to the dummy pixels D1 and D2 as shown in FIG. 5, whereby said signals are retained in the condenser C1 as the dark current signal of the solid-state imaging device SP and supplied through the buffer amplifier BP1 to an input terminal of the differential amplifier. Said differential amplifier, upon subsequent receipt at the other input terminal of the signals corresponding to the photoreceptor pixels S1–Sn, releases the picture signal VF obtained by subtracting, from said signals, the aforementioned dark current component. On the other hand the timing control circuit TCC shifts the gate control signal $A\phi2$ to the H-level to open the analog gate AG2 during the output of the signals corresponding to said photoreceptor pixels S1–Sn from the solid-state imaging device SP, thereby supplying said signals to the peak detection circuit PD. Said peak detection circuit PD is already reset, for example during the output of signals corresponding to the dummy pixels D1, D2, by the reset signal $\phi R$ as shown in FIG. 5 from the timing control circuit TCC, and detects the peak value of the signals corresponding to said photoreceptor pixels S1–Sn received from the differential amplifier through the analog gate AG2. Upon completion of the output of said signals from the solid-state imaging device SP, the timing control circuit TCC shifts the gate control signal $A\phi2$ to the L-level as shown in FIG. 5 to close the analog gate AG2, thereby terminating the peak detection by the peak detection circuit PD and supplying the hold signal $\phi H$ to the peak holding circuit PH to hold therein the peak value VP detected by said peak detection circuit PD. In response to said peak value holding, the comparators CP1 and CP2 respectively compare said peak value with the upper limit reference voltage Vmax and the lower limit reference voltage Vmin and release the result of comparison in logic H- or L-level signals. As an example, in case VP<Vmin, the comparators CP1, CP2 respectively provide L-level and H-level signals, whereby the inverter IV1 provides an H-level signal to set the up-down counter UDC to the upcounting mode and to release an H-level signal from the OR gate OR1 and thus from the exclusive-OR gate EX. Thus, after the peak value holding by the peak holding circuit PH of the peak value VP, the count pulse CP released from the timing control circuit TCC as shown in FIG. 5 is transmitted through the AND gate AN1 to the up-down counter UDC to step advance the same, whereby the output signals Q1–Q3 thereof assume a state L, L, H, thus switching the shortest accumulating time t1 of the solid-state imaging device SP to a longer accumulating time t2 as shown in FIG. 4. Consequently the timing control circuit TCC regulates, in the succeeding scanning operation, the period from the trailing end of the integration clearing signal ICG to the leading end of the shift pulse SH so as to be equal to said accumulating time t2, thereby extending the accumulating time of the solid-state imaging device SP and thus elevating the level of the picture signal VF obtained through said differential amplifier. Such change of accumulating time is repeated until a state Vmin≦VP≦Vmax is reached, when the comparators CP1 and CP2 provide L-level signals to shift the output of the OR gate OR1 to L-level. Consequently the AND gate AN1 forbids the supply of count pulse CP from the timing control circuit TCC to the up-down counter UDC, whereby the accumulating time is no longer changed but fixed at the appropriate value thus reached. Naturally if the state VP<Vmin is again encountered in the course of repetition of scanning with the above-mentioned accumulating time, the above-explained procedure is again conducted to shift the accumulating time to a further longer value, and, if VP>Vmax, the comparators CP1 and CP2 respectively provide H- and L-level output signals to release an L-level signal from the inverter IV1, whereby the up-down counter UDC is set to the down-count mode and is step reduced in response to the count pulse CP from the timing control circuit TCC, thus shifting the accumulating time to an adjacent shorter step. In this manner the solid-state image device SP is so controlled as to have an appropriate accumulating time satisfying the condition Vmin≦VP≦Vmax.

In the foregoing procedure, the initially selected shortest accumulating time t1 is naturally maintained if said accumulating time is appropriate and satisfies the condition Vmin≦VP≦Vmax. Also if a condition VP>Vmax is reached under this state, the comparators CP1 and CP2 respectively provide H- and L-level signals to release an L-level signal from the exclusive-OR gate EX, whereby the accumulating time is not changed but maintained at said shortest time t1.

Now, in case a condition VP<Vmin is encountered while the accumulating time is set at the longest step t8 in the aforementioned control procedure either because of an extremely low incident light intensity inadequate for the use of the image sensor or because of an extremely increased dark current level caused by the very high incident light intensity as explained before, the apparatus of the present embodiment regards such phenomenon as caused by the latter cause and performs a control procedure as will be explained in the following. In case said condition VP<Vmin is encountered while the accumulating time is set at the longest step t8 in which the outputs Q1–Q3 of the up-down counter UDC are all at H-level as shown in FIG. 4, the comparators CP1 and CP2 respectively provide L- and H-level signals to release an H-level signal from the inverter IV1, whereby the exclusive-OR gate EX releases an L-level signal to forbid the supply of the count pulse CP from the timing control circuit TCC to the up-down counter UDC through the AND gate AN1, and the output from the NAND gate NA is shifted from H-level to L-level to turn off the transistor Tr1, thus charging the condenser C2 through the resistor R12. When the terminal voltage of said condenser C2 exceeds the reference voltage determined by the resistors R13, R14 after the lapse of a determined time, the output of the comparator CP3 is shifted from L-level to H-level and resets the up-down counter UDC through the OR gate OR2, whereby the output signals Q1–Q3 of said counter are all shifted to L-level, thus resetting the solid-state imaging device SP to the shortest accumulating time t1. Thus if the aforementioned phenomenon VP<Vmin during the state of longest accumulating time t8 is derived from the extreme increase in the dark current level caused by the very high incident light intensity to the solid-state imaging device SP, the device will be relieved from such state by the abovementioned resetting of the accumulating time and be restored to provide normal or nearly normal picture signals.

In case the charging of condenser C2 is initiated by the turning off of the transistor Tr1 induced by the L-level output from the NAND gate NA but the state VP<Vmin is cancelled in the succeeding scanning before the terminal voltage of said condenser exceeds said reference voltage, the output of the comparator CP2 is shifted to the L-level to release an H-level output from the NAND gate NA, whereby the transistor Tr1 is turned on to immediately discharge the condenser C2, thus preventing the resetting of the accumulating time. In such case, if the resulting state satisfies the condition Vmin≦VP≦Vmax the accumulating time is maintained at the level t8, whereas it will be switched to t7 by the H-level output of the comparator CP1 if a state VP>Vmax is reached.

Figure 6:
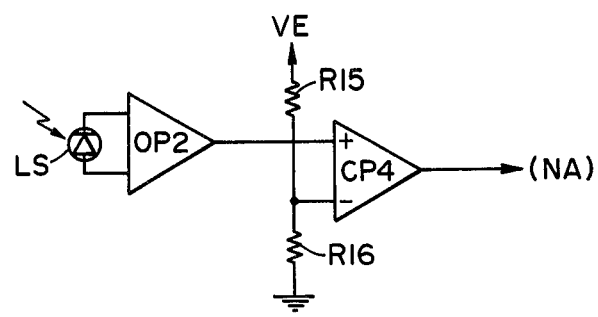
FIG. 6 is a partial circuit diagram showing an example of the intensity level identifying circuit to be attached as an improvement to the embodiment shown in FIGS. 3A and 3B.

In the foregoing embodiment the accumulating time is unconditionally reset in case a state VP<Vmin is encountered during the longest accumulating time t8 of the solid-state imaging device SP according to an estimation that such state is solely caused by the extremely increased dark current component induced by the very high incident light intensity to the solid-state imaging device SP although such state in fact occurs when the incident light intensity is excessively low for the use of the image sensor. It is naturally possible, however, to identify these cases and to reset the accumulating time only in the former case, and for this purpose a brightness identifying circuit as shown in FIG. 6 may be added to the circuit shown in FIG. 3. In FIG. 6 there are shown a light sensor LS for measuring the luminance or intensity of light substantially equal to the incident light to the solid-state imaging device SP, an operational amplifier OP2 constituting a light-measuring circuit with said light sensor LS, voltage-dividing resistors R15 and R16 for providing a determined reference voltage, and a comparator CP4 for comparing the output of said light-measuring circuit with said reference voltage and providing an H-level signal when said output is in excess of said reference voltage, said output being additionally supplied to the NAND gate NA shown in FIG. 3 and being shifted to the H-level only when the incident light intensity to the solid-state imaging device exceeds a certain level. Consequently, in a state of VP<Vmin during the longest accumulating time t8, if the incident light intensity is lower than said determined level said NAND gate NA continues to release the H-level output signal because said comparator CP4 provides an L-level output, whereas if the incident light intensity exceeds said determined level said comparator CP4 releases an H-level output to provide an L-level signal from said NAND gate NA. In this manner it is rendered possible to identify a state of low incident light intensity insufficient for the use of the image sensor from a state of extremely increased dark current component caused by the very high incident light intensity and to reset the accumulating time solely in the latter state.

Figure 7:
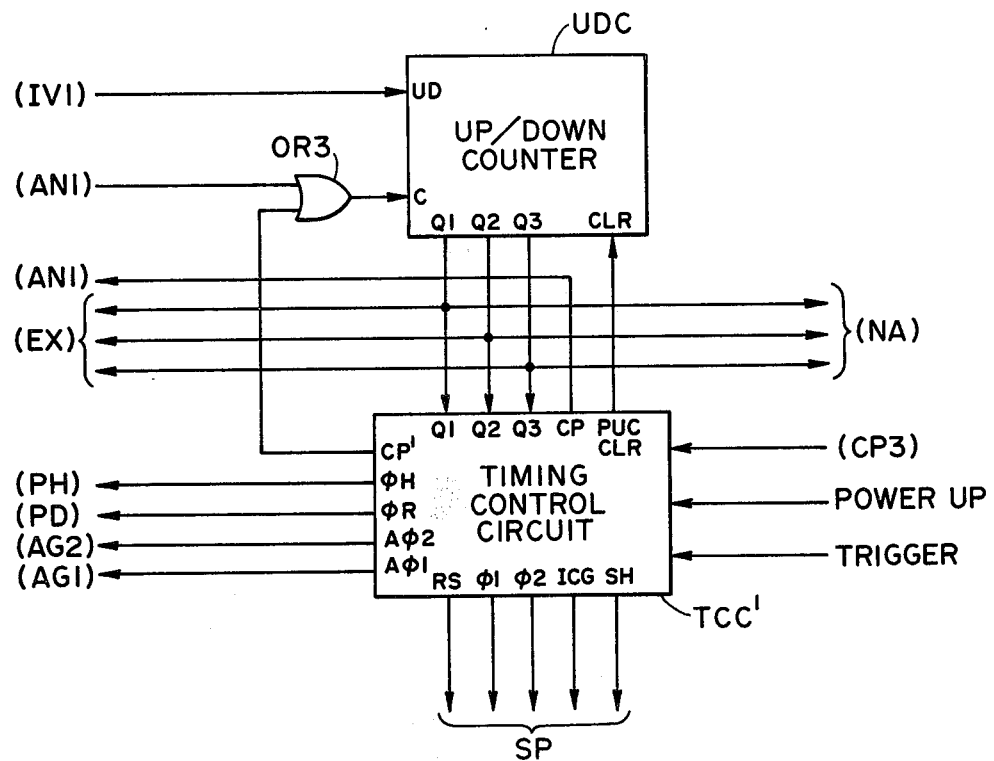
FIG. 7 is a partial circuit diagram showing a modification in the principal portion of the embodiment shown in FIGS. 3A and 3B.

Also in the foregoing embodiment the accumulating time is reset to the shortest level t1, and such resetting is certainly most effective in case an extreme increase in the incident light intensity is anticipated, but the accumulating time should preferably be reset in certain cases, particularly according to the characteristic of the solid-state imaging device, to a different level such as t2, t3 or t4 shown in FIG. 4 instead of the shortest level t1. For this purpose a part of the circuit shown in FIG. 3 can be modified as shown in FIG. 7, in which a timing control circuit TCC' is similar to the timing control circuit TCC shown in FIG. 3 but is additionally capable, in response to the H-level output from the comparator CP3, of providing a single clear pulse CLR, similar to the power-up clear pulse PUC, to the up-down counter UDC to clear said counter and immediately thereafter providing a determined number of auxiliary count pulses CP', similar to the aforementioned count pulse CP, to the count input port of said up-down counter UDC through the OR gate OR3 receiving the output from said AND gate AN1. The remaining circuit is the same as that shown in FIGS. 3A and 3B, except that the OR gate OR2 is dispensed with.

In the above-mentioned circuit, in response to the H-level output from the comparator CP3 as explained in the foregoing, the timing control circuit TCC' immediately releases the clear pulse CLR to reset the up-down counter UDC and thereafter a determined number of auxiliary count pulses CP' to the up-down counter UDC through the OR gate OR3. Since VP<Vmin in this state, the comparator CP1 releases the L-level output to set the up-down counter UDC to the upcount mode, whereby said up-down counter UDC is once reset and advanced by a number corresponding to the number of said auxiliary count pulses CP'. In this manner the accumulating time is reset to a level determined by the number of said auxiliary count pulses CP'. More specifically, the accumulating time is reset to t2 in case only one auxiliary count pulse CP' is given, and is reset to t3, t4, . . . as the number of said pulse is increased.

It will be readily understood that the brightness identifying circuit shown in FIG. 6 is also applicable to the modification shown in FIG. 7.

Now there will be explained another embodiment of the present invention.

FIGS. 8A–8D schematically shows the relation between the change in dark current level resulting from excessive charge flow caused by blooming phenomenon or from light leak and the change in output signal after dark current compensation, on which another embodiment of the present invention is based.

FIGS. 8A and 8B are waveform charts showing time-sequential output of picture information from the solid-state imaging device in which D1–D3 are output signals from dummy pixels for dark current detection while S1–S5 are output signals from photoreceptor pixels. FIG. 8A shows the state in the absence of blooming or light leak in the dummy pixels D1–D3, while FIG. 8B shows the state in which the output of photoreceptor pixels is saturated due to a sudden increase in the incident light, causing blooming phenomenon or light leak in the dummy pixels. FIGS. 8C and 8D are waveform charts showing the differential output signals obtained subtracting the dark current component obtained in the dummy pixels D1–D3 from the picture information containing the dark current component obtained from the photoreceptor pixels S1–S5, wherein FIG. 8C represents appropriate output waveform while FIG. 8D represents the inappropriate output waveform caused by the increased signal. In the state of FIG. 8D, as the output from the photoreceptor pixels is saturated, the differential output signal assumes a single level the same as a picture signal corresponding an object without contrast. Also in case the peak value VP of said differential output signal becomes positioned within the aforementioned appropriate range between Vmax and Vmin due to the increase in the dark current component, the accumulating time remains fixed without shifting to a shorter time even though the output signal from the photoreceptor pixels is saturated in this state.

Now, in case of obtaining digital picture data by digitizing, for example binarizing, the aforementioned scanning signal, the output from the unmasked photoreceptor pixels reaches a constant saturation level if the incident light intensity significantly increases while the accumulating time of the solid-state imaging device is set at a relatively long level, so that the digital picture data obtained by slicing the scanning signal after dark current compensation at a determined level remain at a single level, for example all "1" or all "0" in case of a binary digital signal. Stated inversely, therefore, if such uniform digital value or level of data is caused by the above-mentioned situation, it is possible to restore the image sensor and to obtain appropriate picture signals again by identifying if the digitalized picture data are all in the same level and, if so, switching the accumulating time of the solid-state imaging device to a shorter level. Digitalized picture data consisting solely of a single level are often encountered in case the output of the solid-state imaging device is saturated due to the extremely increased incident light intensity, although such phenomenon is also caused by the uniform contrast-free pattern of the object, and such situation can be resolved in the former case by selecting a shorter accumulating time as explained above.

Another embodiment of the present invention is reached in view of such situation and will be clarified in detail in the following in relation to FIGS. 9A–9C, in which the components represented by same numbers as in FIGS. 3A and 3B are same as those in FIGS. 3A and 3B with respect to the structure, function and connection thereof and will not, therefore, be repeated in detail.

Figure 9:
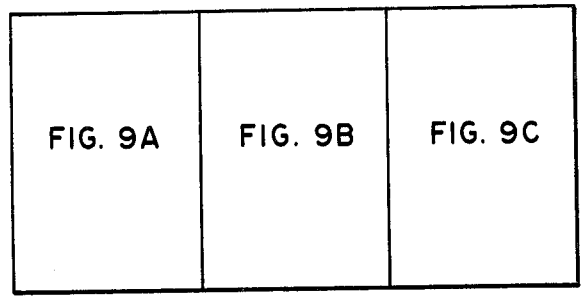
FIG. 9 is a block diagram showing the relative positions of FIGS. 9A–9C.
Figure 9A:
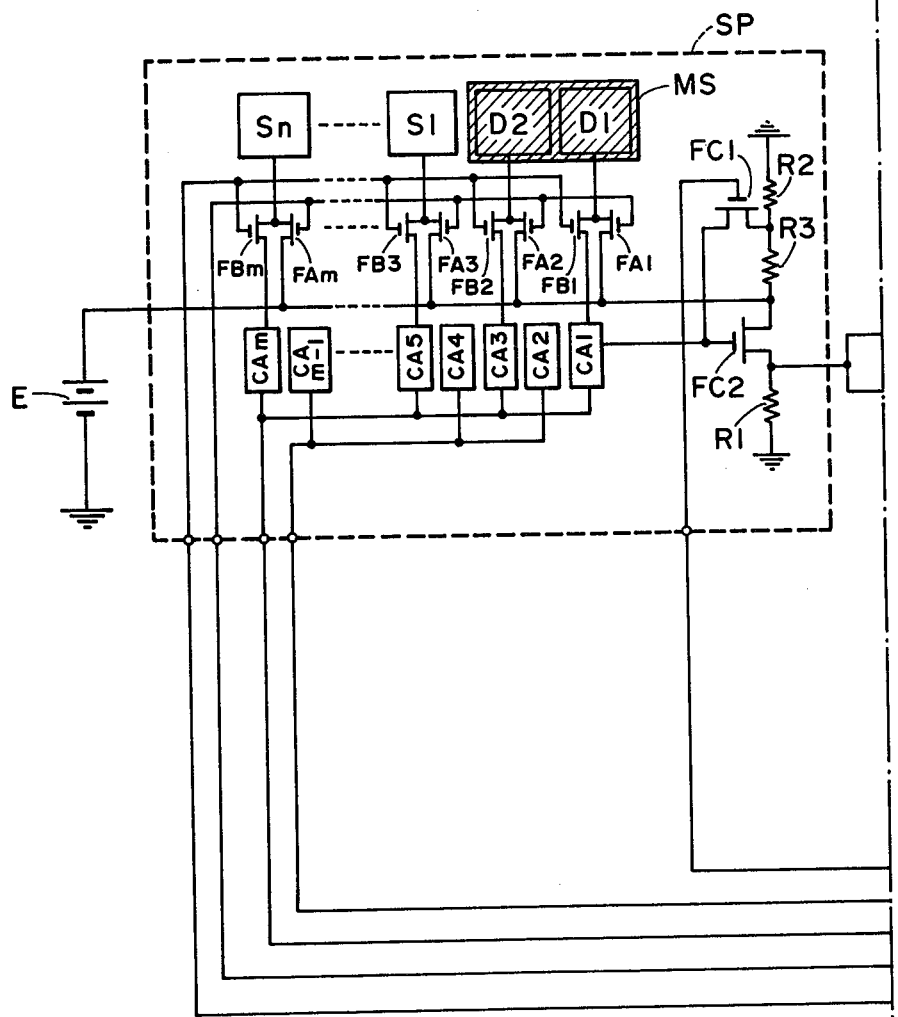
FIGS. 9A–9C together are a circuit diagram showing another embodiment of the present invention.
Figure 9B:
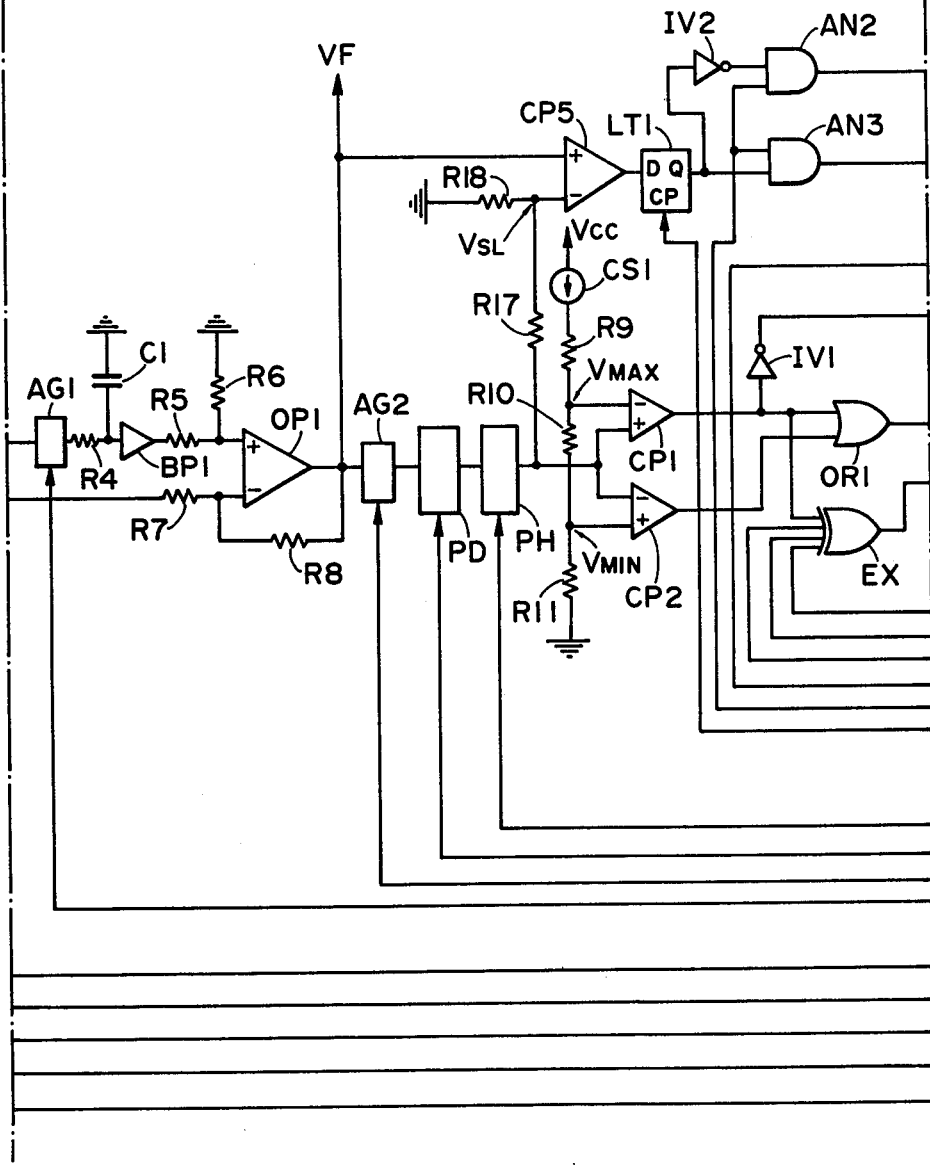
Figure 9C:
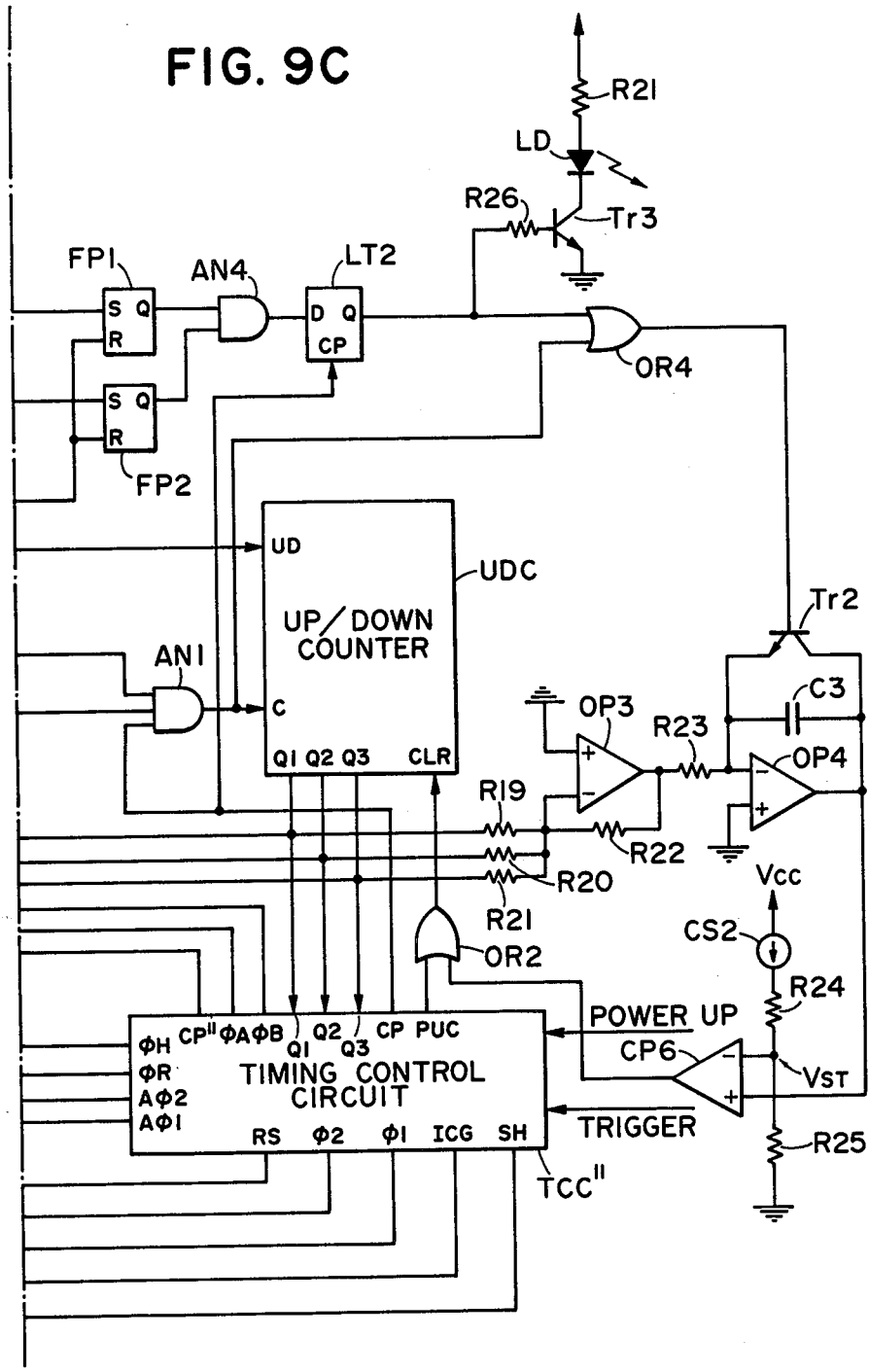
Figure 10:
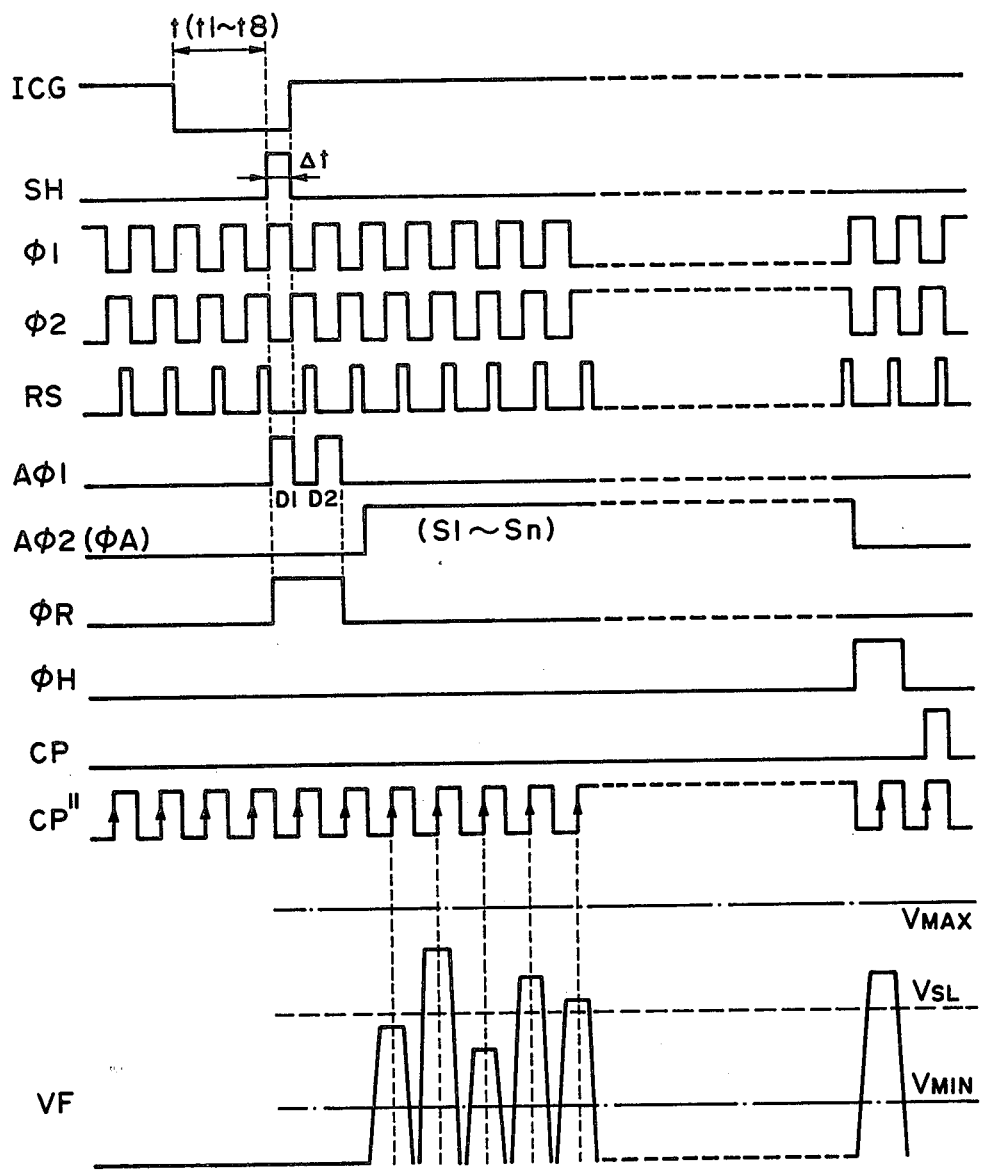
FIG. 10 is a timing chart showing the function of the embodiment shown in FIGS. 9A–9C.

In FIGS. 9A–9C timing control circuit TCC" corresponds to the timing control circuit TCC in FIGS. 3A and 3B but is adapted to provide, in addition to the aforementioned control signals and pulses (ICG, SH, φ1, φ2, RS, Aφ1, Aφ2, φR, φH, CP, PUC), a control signal φA for defining the imaging area, a reset pulse φB to a flip-flop to be explained later, and clock pulses CP'' as shown in FIG. 10 for a latch circuit to be explained later.

Resistors R17 and R18 divide the output of a peak hold circuit PH to provide a reference voltage $V_{SL}$, which is compared with the image signal VF in a comparator CP5 to provide digital (binary) image data. Consequently the foregoing constitutes a digitizing (binarizing) circuit. The digital signal from said comparator CP5 is latched in a latch circuit LT1 in synchronization with the clock pulses CP'' from said timing control circuit TCC''. Said latch circuit LT1 is composed of D-flip-flops etc. and is provided for preventing the generation of error signals eventually generated by the absence of output from the solid-state imaging device SP during the reset pulse RS. The output from said latch circuit and the output of an inverter IV2 are supplied to AND gates AN3, AN2, thereby forming logic product between the pixels defined by the control signal φA (same as Aφ2 as shown in FIG. 10) supplied by the timing control circuit TCC'' for defining the imaging area. The output signals from said AND gates AN2, AN3 are supplied to R-S flip-flops FP1, FP2. In case the output signals from the digital data latch circuit LT1 consists solely of H-level or L-level, either one of said flip-flops FP1 or FP2 is set to provide an L-level signal from an AND gate AN4 and also an L-level signal from a latch circuit LT2 synchronized with the count pulses CP. On the other hand in case the digital data contain H- and L-levels, the flip-flops FP1, FP2 are both set to provide an H-level signal from the AND gate AN4, and to provide an H-level signal also from the latch circuit LT2 in synchronization with the count pulses CP. The output of said latch circuit LT2 and the output of said AND gate AN1 are supplied to an OR gate OR4 for controlling a transistor Tr2 which in turn controls a time control circuit to be explained later. As already explained in the foregoing, the AND gate AN1 provides an H-level signal when the peak value VP of the image signal VF is positioned outside the appropriate voltage range, i.e. in case of VP>Vmax or VP<Vmin, in which the accumulating time is to be shifted by means of the up-down counter UDC.

After the turning off of the transistor Tr1, when the output of the time constant circuit composed of a resistor R23, a condenser C3 and an operational amplifier OP4 exceeds a reference voltage $V_{ST}$ of a reference voltage circuit composed of a constant current source CS2 and resistors R24, R25, a comparator CP6 releases an H-level signal which is supplied as a reset pulse to the up-down counter UDC through the OR gate OR2 also receiving the clear pulse PUC from the timing control circuit TCC''.

In the present embodiment, the output terminals Q1, Q2 and Q3 of the up-down counter UDC are respectively connected to resistors R19, R20 and R21 with resistance ratio for example of 4:2:1, whereby a signal current corresponding to the accumulating time is given to the time constant circuit (OP4, R23 and C3) through an adding circuit composed of an operational amplifier OP3 and a resistor R22. Consequently, in case the single level state of the digitalized image signal continues for a determined period determined in relation to the accumulating time, said accumulating time determined by the up-down counter UDC is shifted to a shorter level, for example to the shortest level t1.

Also an alarm indicating circuit is composed of resistors R26, R27, a transistor Tr3, and a light-emitting diode LD.

There is also provided a constant current source CS1 for providing a serial circuit of resistors R9, R10 and R11 with a constant current.

Except for the parts explained above, the embodiment is same as the circuit shown in FIGS. 3A and 3B.

Now, in case the digital data from the comparator CP5 contain H- and L-level, the flip-flops FP1 and FP2 are both set to provide H-level Q-output signals, whereby the latch circuit LT2 also provides an H-level signal to turn on the transistor Tr2, thereby forbidding the function of the time constant circuit consisting of the operational amplifier OP4, resistor R23 and condenser C3. In such state the accumulating time of the solid-state imaging device SP is controlled in the normal manner for obtaining appropriate image signal VF as alread in relation to the embodiment shown in FIGS. 3A and 3B. Also in this state the transistor Tr3 is turned on to light the light-emitting diode LD, thereby indicating the presence of an appropriate image signal under appropriate accumulating time control.

However, in case the digitalized image signal contains only one level during a state Vmax>VD>Vmin and during a control with a relatively long accumulating time, the following procedure is effected anticipating that such situation is caused by the saturated output of the photoreceptor pixels due to an extremely increased dark current level resulting from a very high incident light intensity to the solid-state imaging device SP, although such situation is also caused by an extremely low contrast of the object. In such situation, wherein the digitalized image signal contains only one level, the flip-flops FP1, FP2 are not set to provide an L-level output from the latch circuit LT2, whereby the transistor Tr3 is turned off to extinguish the light-emitting diode LD, thus indicating the fixed accumulating time despite the inappropriate image signal VF. Also in case Vmax>VP>Vmin in this situation, the supply of count pulses CP from the timing control circuit TCC'' to the up-down counter UDC is forbidden by the AND gate AN1, whereby the OR gate OR4 provides an L-level signal to turn off the transistor Tr2, thus initiating to charge the condenser C3 through the resistor R23. When the terminal voltage of said condenser C3 exceeds a reference voltage $V_{ST}$ determined by the resistors R24, R25 after a determined time, the output from the comparator CP6 is shifted from L-level to H-level and is supplied to the up-down counter UDC through the OR gate OR2, whereby said up-down counter UDC is reset to provide H-level signals from the output terminals Q1-Q3 thereof, thus resetting the accumulating time to the shortest level t1. In case the accumulating time before such resetting is relatively long, for example at t5, the up-down counter UDC provides H-, L- and L-level signals respectively from the output terminals Q1-Q3 thereof, so that a current corresponding to said accumulating time is generated by the resistors R19-R22 and the operational amplifier OP3 to control the integrating current of the aforementioned time constant circuit through the resistor R23. In this manner, when the single level state of the digitalized image signal continues for a period determined in relation to the accumulating time, such state, if caused by the extremely increased dark current signal level due to the very high incident light intensity to the solid-state imaging device SP, can be avoided by said resetting of the accumulating time, thus enabling to obtain an appropriate or nearly appropriate image signal.

If the charging of the condenser C3 is initiated when the transistor Tr2 is turned off by the L-level output signal from the OR gate OR4 but the single level state of the image signal is cancelled in the succeeding scanning before the terminals voltage of said condenser exceeds the aforementioned reference voltage, the latch circuit LT2 provides an H-level signal through the gate OR4 to turn on the transistor Tr2, thus immediately discharging the condenser C3 and thus avoiding the resetting of the accumulating time.

Figure 11:
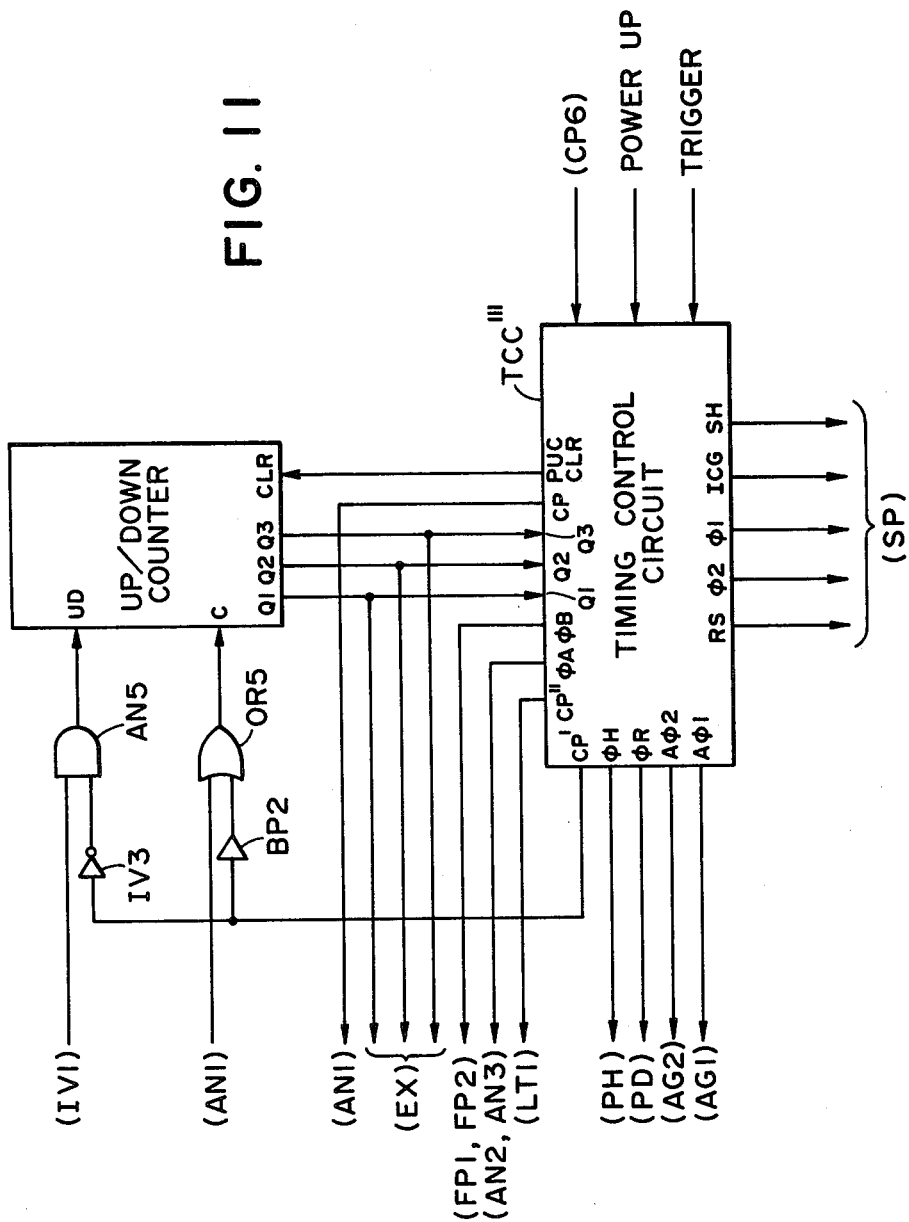
FIG. 11 is a partial circuit diagram showing a modification in the principal portion of the embodiment shown in FIG. 9.

In the foregoing embodiment the accumulating time is reset always to the shortest level t1 and such resetting is certainly most effective in case an extreme increase in the incident light intensity is anticipated, but it is naturally possible also to shift the accumulating time to a relatively short level such as t2, t3 or t4 shown in FIG. 4 instead of the shortest level t1 in certain cases, particularly according to the characteristic of the solid-state imaging device SP. For such purpose a part of the circuit shown in FIGS. 9A–9C may be modified as shown in FIG. 11. In FIG. 11 a timing control circuit TCC''', similar to the timing control circuit TCC'' shown in FIG. 9C, is additionally adapted to provide, in response to the H-level output from said comparator CP6, a single clear pulse CLR similar to the power-up clear pulse PUC to the up-down counter UDC for clearing said counter and, immediately thereafter, a determined number of auxiliary count pulses CP'', similar to the aforementioned count pulses CP, to the count input terminal of the up-down counter UDC through a buffer amplifier BP2 and an OR gate OR5 receiving also the output of the AND gate AN1, and also to the count mode control terminal UD of said up-down counter UDC through an inverter IV3 and an AND gate AN5 receiving also the output of the inverter IV1. The remaining part of the circuit is same as shown in FIGS. 9A–9C, except that the OR gate OR2 is eliminated.

Thus, in response to the H-level output from the comparator CP6, the timing control circuit TCC''' releases immediately the clear pulse CLR to reset the up-down counter UDC and thereafter a determined number of auxiliary count pulses CO' through a buffer amplifier BP2 and an OR gate OR5 to the count input port of said up-down counter UDC. Said buffer amplifier BP2 is provided for slightly delaying said auxiliary count pulses CP', which are thus supplied to the count input port C of the up-down counter after it is set to the down-count mode through the inverter IV3 and the AND gate AN5 in synchronization with the auxiliary count pulses CP', whereby said up-down counter is once reset and then stepped down corresponding to the number of said auxiliary count pulses CP', thus resetting the accumulating time to a level determined by the number of said pulses. For example, if the resetting circuit is activated by the single level state of the digital data continuing over a determined time while the accumulating time is set at the level t5, it is reset to the level t4 when only one auxiliary count pulse CP' is given or to the level t2, t3, . . . as the number of the auxiliary count pulses is increased.

As detailedly explained in the foregoing, in an image sensor utilizing the dark current compensation for the scanning output signal from a solid-state imaging device and the control on the signal integrating time based on the level of said scanning output signal in combination, or more specifically in an image sensor adapted, in the scanning of an image, to cause the solid-state imaging device to release in succession the dark current signal generated therein and the scanning signal containing said dark current signal, subtracting said dark current signal from said scanning signal in a differential circuit to obtain the image signal corresponding to said image and to control the image signal integrating time of said solid-state imaging device in response to the level of said image signal and in such a manner that said level is contained within a determined level range, the present invention allows to securely prevent the inconvenience of fixed signal integrating time observable for instance in response to a sudden increase in the incident light intensity during a state of a relatively long signal integrating time, thus maintaining satisfactory control on the signal integrating time and even under such situation and providing appropriate image signals, and is therefore extremely useful in the image sensor as mentioned above.

In the foregoing embodiments the signal integrating time or accumulating time of the solid-state imaging device is identified as appropriate or inappropriate according to whether the peak value of the image signal is positioned or not within a determined level range, but the present invention is naturally not limited to such embodiments but also includes for example a method of identifying whether the averaged level of the image signal is positioned within a determined level range or a method of identifying the state of digitized image signal.

Similarly the detection of the dark current signal in the foregoing embodiments is achieved by dummy pixels formed by masking, for example with an aluminum deposition layer, a part of the pixels of the solid-state imaging device, but it is also possible to obtain the dark current signal from a dark current generating part which is not photosensitive or from a dummy transfer cell inserted in the charge transfer analog shift register. In the latter method, for example, the charge transfer gates FB1, FB2 corresponding to the dummy pixels D1, D2 of the solid-state imaging device SP shown in FIG. 9 are eliminated, and the signal obtained in the register cells CA1–CA4 is utilized as the dark current signal.

Furthermore, in the embodiment shown in FIGS. 3A and 3B the resetting of the accumulating time is effected in case the accumulating time is set at the longest level t8 and the state VP<Vmin continues for a period determined by the time constant circuit composed of the resistor R12 and the condenser C2 whereby such resetting is not conducted if the above-mentioned state is resolved within said period. However if such arrangement is not necessary, the output of the NAND gate NA, instead of the output of the comparator CP3, can be directly supplied to the OR gate OR2 or to the timing control circuit TCC' in case of modification shown in FIG. 7.

Similarly in the embodiment shown in FIGS. 9A–9C, the resetting of the accumulating time is effected in case the one-level state of the digital data continues for a period determined by the time constant circuit composed of the resistor R23 and condenser C3 whereby such resetting is not conducted if the above-mentioned state is resolved within said period. However if such arrangement is not necessary, the inverted output from the latch circuit LT2 instead of the output from the comparator CP6 can be directly supplied to the OR gate OR2 or to the timing control circuit TCC" in case of the modification shown in FIG. 11.

The image sensor of the present invention is applicable, for example, to the range finder as disclosed in the U.S. Pat. Nos. 4,189,232 and 4,178,098 or in the U.S. patent application Ser. No 944,974, now U.S. Pat. No. 4,305,657, to the range finder as disclosed as an embodiment in the U.S. patent application Ser. No. 166,962 now U.S. Pat. No. 4,368,978, all assigned to the assignee of this application or to the range finder in U.S. Pat. No. 4,004,852.

The peak detection circuit PD and the peak holding circuit PH shown in FIGS. 3A and B and 9A–9C can be composed of those as disclosed in an embodiment of the above U.S. patent application Ser. No. 166,962, now U.S. Pat. No. 4,368,978.

What I claim is:

1. A radiation sensing system comprising:
   (A) radiation sensing means of the signal integrating type arranged to produce a dark current signal and a radiation sensing signal containing the dark current signal;
   (B) means for conducting dark current compensation on said radiation sensing signal on the basis of said dark current signal and for producing a dark current compensated sensing signal;
   (C) means for controlling a signal integrating time of said sensing means on the basis of said dark current compensated sensing signal;
   (D) means for detecting the condition that the dark current compensated sensing signal is below a predetermined level while the signal integrating time remains unchanged; and
   (E) means for resetting the signal integrating time of said sensing means from a previously set time to a shorter time, said resetting means including a timer circuit and being arranged to reset the signal integrating time, responsive to detection of said condition by said detecting means for a period determined by said timer circuit while the signal integrating time remains unchanges.

2. The system according to claim 1, wherein said signal integrating time control means is adapted to control the signal integrating time up to a maximum integrating time, and wherein said resetting means is arranged to reset the signal integrating time when said detecting means detects said condition for a period determined by said timer circuit while the signal integrating time is fixed at said maximum integrating time controllable by said signal integrating time control means.

3. The system according to claim 1, wherein said timer circuit is arranged to determine different times in accordance with the signal integrating time controlled by said signal integrating time control means.

4. The system according to claim 1, 2 or 3, wherein said signal integrating time control means is adapted to control the signal integrating time down to a minimum integrating time, and wherein said shorter time to which the signal integrating time is to be reset by said resetting means is said minimum integrating time controllable by said signal integrating time control means.

5. A radiation sensing system comprising:
   (A) radiation sensing means of the signal integrating type and arranged to produce a dark current signal and a radiation sensing signal containing the dark current signal;
   (B) means for conducting dark current compensation on said radiation sensing signal on the basis of said dark current signal and for producing a dark current compensated sensing signal;
   (C) means for controlling a signal integrating time of said sensing means within a range between a minimum and a maximum signal integrating time, on the basis of said dark current compensated sensing signal;
   (D) means for detecting the condition that the dark current compensation sensing signal is below a predetermined level while the signal integrating time remains unchanged at said maximum signal integrating time; and
   (E) means for resetting the signal integrating time of said sensing means from said maximum signal integrating time to a shorter time responsive to detection of said condition by said detection means.

6. The system according to claim 5, wherein said signal integrating time control means is arranged to control the signal integrating time of said sensing means on the basis of the level of the dark current compensated sensing signal in such a manner that said level is positioned within a predetermined range having a lower and an upper limits, and wherein said predetermined level is said lower limit of said predetermined range.

7. The system according to claim 5 or 6, wherein said resetting means includes a timer circuit and is arranged to reset the signal integrating time, responsive to detection of said condition by said detection means for a period determined by said timer circuit while the signal integrating time is controlled at said maximum integrating time controllable by said signal integrating time control means.

8. The system according to claim 7, wherein said shorter time to which the signal integrating time is to be reset by said resetting means is said minimum signal integrating time controllable by said signal integrating time control means.

9. The system according to claim 5 or 6, wherein said shorter time to which the signal integrating time is to be reset by said resetting means is said minimum integrating time controllable by said signal integrating time control means.

10. A radiation sensing system comprising:
    (A) radiation sensing means of the signal integrating type arranged to produce a dark current signal and a radiation sensing signal containing the dark current signal;
    (B) means for conducting dark current compensation on said radiation sensing signal on the basis of said dark current signal and for producing a dark current compensated sensing signal,
    (C) means for controlling a signal integrating time of said sensing means between a predetermined minimum and a predetermined maximum integrating time, on the basis of said dark current compensated sensing signal;
    (D) signal condition detecting means for detecting the signal condition that said dark current compensated sensing signal is below a predetermined level; and
    (E) means for resetting the signal integrating time of said sensing means from one integrating time to a shorter time, said resetting means including a radiation intensity detecting circuit for detecting the intensity of radiation incident on said sensing means and being arranged to reset the signal integrating time to said shorter time responsive to said signal condition detecting means detecting said signal condition and said radiation intensity detecting circuit detecting the radiation intensity condition that the incident radiation intensity is in excess of a certain level while the signal integrating time is controlled at said maximum integrating time controllable by said signal integrating time control means.

11. The system according to claim 10, wherein said signal integrating time control means is arranged to control the signal integrating time of said sensing means on the basis of the level of the dark current compensated sensing signal in such a manner that the dark current compensated sensing signal level is positioned within a predetermined range having a lower and an upper limits, and wherein said predetermined level of said dark current compensated signal is said lower limit of said predetermined range, and wherein said resetting means is arranged to reset the signal integrating time to said shorter time responsive to detection by said signal condition detecting means and said radiation intensity detecting circuit of said signal condition and said radiation intensity condition, respectively, while the signal integrating time is controlled at said maximum integrating time controllable by said signal integrating time control means.

12. The system according to claim 10 or 11, wherein said resetting means includes a timer circuit and is arranged to reset the signal integrating time responsive to detection by said signal condition detecting means and said radiation intensity detecting circuit of said signal condition and said radiation intensity condition, respectively, for a period determined by said timer circuit while the signal integrating time is controlled at said maximum integrating time controllable by said signal integrating time control means.

13. The system according to claim 1, wherein said shorter time to which the signal integrating time is to be reset by said resetting means is said maximum integrating time controllable by said signal integrating time control means.

14. The system according to claim 10 or 11, wherein said shorter time to which the signal integrating time is to be reset by said resetting means is said maximum integrating time controllable by said signal integrating time control means.

15. A radiation sensing system comprising:
(A) radiation sensing means of the signal integrating type arranged to produce a dark current signal and a radiation sensing signal containing the dark current signal;
(B) means for conducting dark current compensation on said radiation sensing signal on the basis of said dark current signal and for producing a dark current compensated sensing signal;
(C) means for controlling a signal integrating time of said sensing means between a minimum and a maximum integrating times on the basis of said dark current compensated sensing signal; and
(D) means for resetting the signal integrating time of said sensing means from one integrating time to a shorter time, said resetting means including a discriminating cicruit for discriminating whether digitized data of said dark current compensated sensing signal consists of a uniform digital value, and being arranged to reset the signal integrating time to said shorter time responsive to said discriminating circuit discriminating that said digitized data consist of a uniform digital value while the signal integrating time remains unchanged at a given value.

16. The system according to claim 15, wherein said digitized data are binary data composed of "1" and "0" determined according to the level of the dark current compensated sensing signal, and said discriminating circuit is arranged to discriminate whether said binary data are composed solely of a single one of the values "1" or "0".

17. The system according to claim 15 or 16, wherein said resetting means further includes a timer circuit and is arranged to reset the signal integrating time responsive to discrimination by said discriminating circuit, for a period determined by said timer circuit that said digitized data consist of a uniform digital value, while the signal integrating time remains unchanges at a given value.

18. The system according to claim 17, wherein said timer circuit is arranged to determine different times in accordance with the signal integrating time controlled by said signal integrating time control means.

19. The system according to claim 18, wherein said shorter time to which the signal integrating time is to be reset by said resetting means is said minimum integrating time controllable by said signal integrating time control means.

20. The system according to claim 17, wherein said shorter time to which the signal integrating time is to be reset by said resetting means is said minimum integrating time controllable by said signal integrating time control means.

21. The system according to claim 15 or 16, wherein said shorter time to which the signal integrating time is to be reset by said resetting means is said minimum integrating time controllable by said signal integrating time control means.

22. A radiation sensing system comprising:
(A) radiation sensing means of the signal integrating type arranged to produce a dark current signal and a radiation sensing signal containing the dark current signal;
(B) means for conducting dark current compensation on said radiation sensing signal on the basis of said dark current signal and for producing a dark current compensated sensing signal;
(C) means for controlling a signal integrating time of said sensing means between a minimum and a maximum integrating times, on the basis of said dark current compensated sensing signal;
(D) means for generating digitized data of said dark current compensated sensing signal;
(E) condition detecting means for detecting the condition that the digitized data of the dark current compensated sensing signal consist of a uniform digital value; and
(F) means for resetting the signal integrating time of said sensing means to said minimum time responsive to detection of said condition by said condition detecting means.

23. The system according to claim 22, wherein said resetting means includes a timer circuit and is arranged to reset the signal integrating time responsive to detection of said condition by said condition detecting means for a period determined by said timer circuit.

24. The system according to claim 23, wherein said timer circuit is arranged to determine different times in accordance with the signal integrating time controlled by said signal integrating time control means.

* * * * *

UNITED STATES PATENT AND TRADEMARK OFFICE
CERTIFICATE OF CORRECTION

PATENT NO. : 4,484,223
DATED : November 20, 1984
INVENTOR(S) : TOKUICHI TSUNEKAWA It is certified that error appears in the above-identified patent and that said Letters Patent is hereby corrected as shown below:

Column 2, line 21, before "charge" delete --the--.

Column 3, line 23, after "data" insert --)--.

Column 6, line 38, between "and" and "an" insert --releasing--.

Column 14, line 9, between "the" and "embodiment" insert --present--;

line 21, change "alread" to --already explained--;

Column 17, line 8, before "U.S." delete --the--;

line 42, change "unchanges" to --unchanged--.

Column 18, line 25, "limits" should be --limit--.

Column 19, line 17, "limits" should be --limit--.

line 37, "1" should be --12--.

UNITED STATES PATENT AND TRADEMARK OFFICE
CERTIFICATE OF CORRECTION

PATENT NO. : 4,484,223

DATED : November 20, 1984

INVENTOR(S) : TOKUICHI TSUNEKAWA

It is certified that error appears in the above-identified patent and that said Letters Patent is hereby corrected as shown below:

Column 20, line 16, "unchanges" should be --unchanged--.

Signed and Sealed this

Twenty-second Day of October 1985

[SEAL]

Attest:

DONALD J. QUIGG

Attesting Officer

Commissioner of Patents and
Trademarks—Designate